US006954325B2

(12) United States Patent
Liu et al.

(10) Patent No.: US 6,954,325 B2
(45) Date of Patent: Oct. 11, 2005

(54) METHOD AND DISC DRIVE FOR WRITING SERVO WEDGES

(75) Inventors: Xiong Liu, Singapore (SG); Bi Qiang, Singapore (SG); Kevin Arthur Gomez, Singapore (SG); Min Shuangquan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 478 days.

(21) Appl. No.: 09/896,792

(22) Filed: Jun. 28, 2001

(65) Prior Publication Data

US 2002/0036859 A1 Mar. 28, 2002

Related U.S. Application Data

(60) Provisional application No. 60/236,312, filed on Sep. 28, 2000.

(51) Int. Cl.[7] ........................... G11B 21/02; G11B 5/596
(52) U.S. Cl. ..................... 360/75; 360/77.08; 360/62
(58) Field of Search .............................. 360/61, 62, 63, 360/48, 75, 51, 77.08, 77.02

(56) References Cited

U.S. PATENT DOCUMENTS

| 4,414,589 A | 11/1983 | Oliver et al. ................ 360/77 |
| 4,912,576 A | 3/1990 | Janz ........................ 360/77.07 |
| 5,448,429 A | 9/1995 | Cribbs et al. ................. 360/75 |
| 5,485,322 A | 1/1996 | Chainer et al. ............... 360/51 |
| 5,541,784 A | 7/1996 | Cribbs et al. ................. 360/75 |
| 5,659,436 A | 8/1997 | Yarmchuk et al. ............ 360/75 |
| 5,668,679 A | 9/1997 | Swearingen et al. ......... 360/75 |
| 5,793,554 A | 8/1998 | Chainer et al. .............. 360/75 |
| 5,793,555 A | 8/1998 | Belser et al. ................ 360/75 |
| 5,844,742 A | 12/1998 | Yarmchuk et al. ............ 360/75 |
| 5,875,064 A | 2/1999 | Chainer et al. .............. 360/75 |
| 5,907,447 A | 5/1999 | Yarmchuk et al. ............ 360/75 |
| 6,005,738 A | 12/1999 | Chainer et al. .............. 360/75 |
| 6,101,063 A | 8/2000 | Chainer et al. .............. 360/75 |
| 6,519,107 B1 * | 2/2003 | Ehrlich et al. ............... 360/75 |
| 6,600,620 B1 * | 7/2003 | Krounbi et al. .............. 360/75 |

FOREIGN PATENT DOCUMENTS

WO          WO 94/11864          5/1994

* cited by examiner

*Primary Examiner*—Andrew L. Sniezek
(74) *Attorney, Agent, or Firm*—Fellers, Snider, et al.

(57) ABSTRACT

A method and disc drive are disclosed that write servo wedges to a plurality of tracks of a disc. A head having a read element offset from a write element reads a servo wedge on a first track as a propagation guide and writes two or more servo wedges to be used as a subsequent propagation guide on a second track, all during one instance of a sector position of the disc rotating by the head. Additionally, a one of the written servo wedges can be radially continuous from the outer to inner diameter and is used for track-following during normal operation. In this manner, all radially continuous servo wedges for each sector of a given track can be written during one revolution of the disc, thereby reducing the amount of time necessary for servowriting.

20 Claims, 6 Drawing Sheets

MATCH LINE TO FIG.4B

FIG.5

METHOD AND DISC DRIVE FOR WRITING SERVO WEDGES

RELATED APPLICATIONS

This application claims priority of U.S. provisional application Ser. No. 60/236,312, filed Sep. 28, 2000.

FIELD OF THE INVENTION

This application relates generally to servowriting and more particularly to a method and disc drive for writing servo wedges using an offset read/write head.

BACKGROUND OF THE INVENTION

Disc drives store data in tracks that form concentric circles on discs containing a storage medium such as a magnetic material. Each track is broken down into various segments known as sectors that are indexed by the disc drive so as to be independently addressable. For each sector, one or more servo wedges must be included to guide a read/write head of the disc drive. The one or more servo wedges extend from the inner diameter of a given zone of the drive to the outer diameter of the zone and contain individual servo bursts that delineate track boundaries and that can be read by the head to produce a signal that indicates the head's position relative to the track boundary.

The servo wedges must be written onto the disc during the manufacturing process. One manner of doing so is to use a servo track writing mechanism. The servo track writing mechanism is a separate device that applies magnetic fields to the disc to add the servo bursts that form the servo wedges. However, the servo track writer can become inaccurate for relatively high track densities. Therefore, self-servowriting has been developed whereby the read/write head of the disc drive writes the servo bursts. This process is time-consuming because the read/write head of a disc drive generally cannot read and write at the same time and multiple revolutions of the disc are required for the servo wedges of a single track to be written. The multiple revolutions are required so that the head can read one previously written servo wedge including one or more bursts so as to stay on the correct track and then write another servo burst corresponding to another servo wedge of the same sector later in time.

Utilizing a head with an offset read element and write element allows the read element to read a servo wedge including one or more bursts from one track while the write element is positioned over another track. Once the disc has rotated to the appropriate place after reading the servo wedge, the write element can write a new servo wedge such as a servo burst for the track it resides above. This offset between the read and write elements thereby allows the servo wedges of a track to be written without seeking the head between a track having servo wedges previously written and the track currently being written for each switch between a read and write operation.

However, at least two revolutions are required for each track using conventional self-servowriting with the offset head because a servo pattern of multiple bursts forming the servo wedge must be written to the disc surface for each sector and be continuous from the outer diameter to the inner diameter. In a first revolution, a first servo wedge of a sector which acts as a track-following guide for propagation, is read from a first track. Also during this revolution but at a different time, the write element writes a second servo wedge, which is the guide used for track-following during normal operation and during propagation of the first wedge, on a second track spaced from the first track by the offset for each sector position as it passes by the head. In a second revolution, the first servo wedge is written for the second track so as to continue to act as a guide for propagation and the second servo wedge of the first track is then read for each sector position as it passes by the head to accurately track-follow while the first servo wedge is being written. With thousands of tracks per disc surface, each revolution required per track for servowriting adds a significant amount of time to the manufacturing process.

Accordingly there is a need for a method and disc drive that can reduce the amount of time necessary for propagating servo wedges onto the disc.

SUMMARY OF THE INVENTION

Against this backdrop, embodiments of the present invention have been developed. An embodiment of the present invention may be viewed as a method of servowriting in a disc drive having a head with an offset radially between a read element and a write element. The method involves, during an instance of a first sector position passing by the head, reading a first servo wedge on a first track with the read element. The method also involves, during the instance of the first sector position passing by the head, and not during reading of the first servo wedge, writing a second and third servo wedge on a second track with the write element.

An embodiment of the present invention may also be viewed as a disc drive that writes servo wedges. The disc drive includes one or more discs having a plurality of tracks divided into a plurality of sector positions and a head having a read element and a write element separated by an offset radially. The disc drive also includes a read/write channel in electrical communication with the read element and the write element. During an instance of a first sector position passing by the head, the read/write channel reads a first servo wedge on a first track with the read element, and during the instance of the first sector position passing by the head and not during reading of the first servo wedge, the read/write channel writes a second and third servo wedge on a second track with the write element.

These and various other features as well as advantages which characterize the present invention will be apparent from a reading of the following detailed description and a review of the associated drawings.

DETAILED DESCRIPTION

Figure 1:
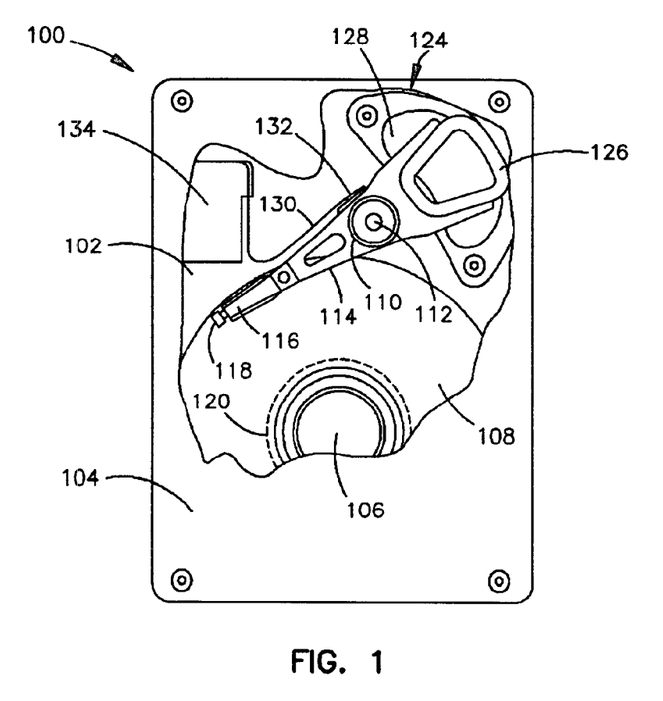
FIG. 1 is a plan view of a disc drive incorporating a preferred embodiment of the present invention showing the primary internal components.

A disc drive 100 constructed in accordance with a preferred embodiment of the present invention is shown in FIG.

1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads 118 are parked.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly 130 terminates at a flex bracket 134 for communication through the base deck 102 to a disc drive printed circuit board (not shown) mounted to the bottom side of the disc drive 100.

Figure 2:
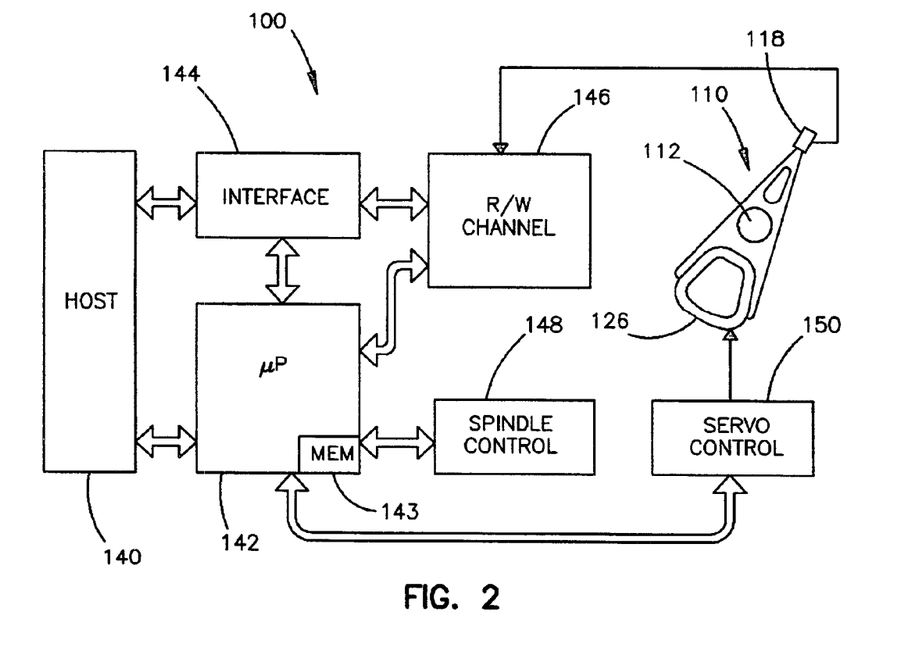
FIG. 2 is a block diagram of the main components of the disc drive embodiment of FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor 126, thereby causing the actuator assembly 110 to be pivoted.

Data is transferred between the host computer 140 and the disc drive 100 by way of a disc drive interface 144, which incorporates a buffer to facilitate high speed data transfer between the host computer 140 and the disc drive 100. Data to be written to the disc drive 100 is thus passed from the host computer 140 to the interface/buffer 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface/buffer 144 for subsequent transfer to the host computer 140. Such operations of the disc drive 100 are well known in the art and are discussed, for example, in U.S. Pat. No. 5,276,662 issued Jan. 4, 1994 to Shaver et al.

Embodiments of the present invention may employ read/write channel 146 to read and write servo wedges or, alternatively, may employ additional dedicated circuitry (not shown) to implement the self-servo writing embodiment of the present invention. Likewise, microprocessor 142 may be employed and programming for execution of the self-servowriting embodiment of the present invention may be contained in MEM 143 or may be a temporary overlay in the buffer/interface 144.

Figure 3:
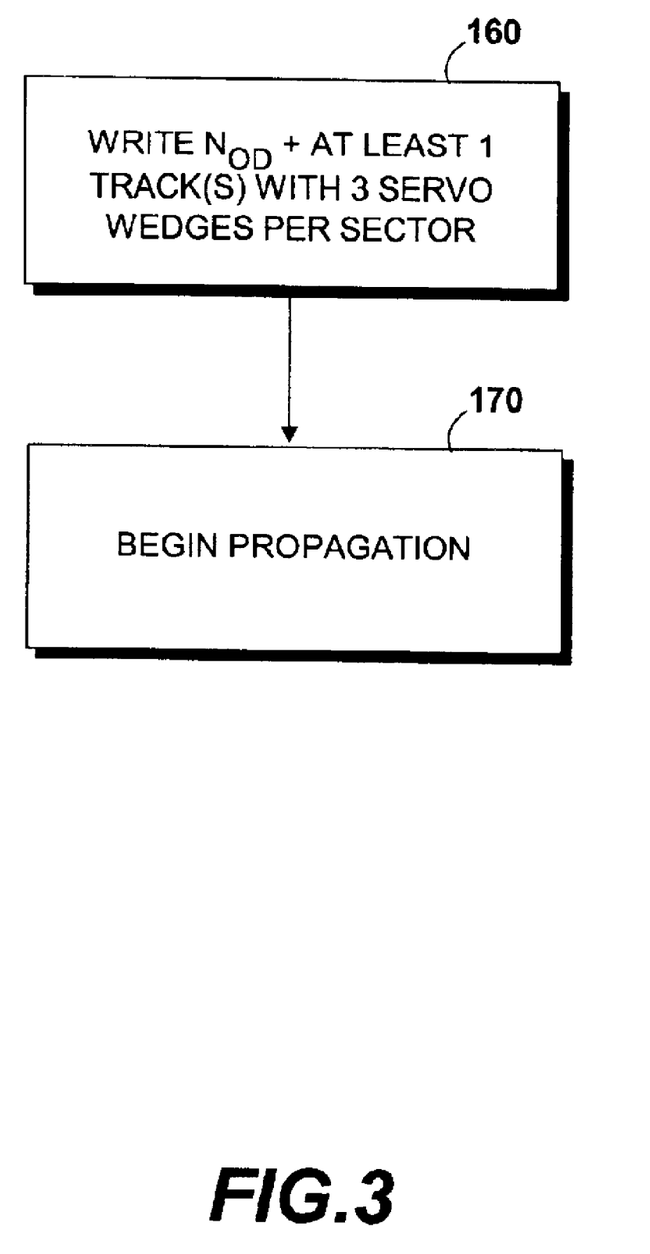
FIG. 3 is a flow chart of an embodiment of a servowriting process of the disc drive of FIG. 1.

A high-level operational flow of a self-servowriting embodiment is shown in FIG. 3. With reference to both FIG. 3 and FIG. 5, which shows a disc surface 300 with wedges 320, 322, 324, and 325 propagated by the self-servowriting process embodiment of the present invention, the self-servowriting process may begin at Write operation 160. At Write operation 160, a servo track writer, or in the alternative the read/write channel 146 through writer 306, writes burst patterns such as 'A' servo burst 326 and 'B' servo burst 328 for four servo wedges 320, 322, 324, and 325 for each sector position 302, 304 for a number of tracks 310 at the outer diameter of the disc 108 equal to an offset at the outer diameter ($N_{OD}$) plus at least 1. Timing bursts 327 shown in FIG. 5 are used for timing the propagation, such as aligning the sector 0 of different tracks from the outer diameter to the inner diameter.

The $N_{OD}$+1 or more tracks are prewritten at the outer diameter in this embodiment because the writer 306 leads the reader 308 when moving from the outer diameter to the inner diameter. The offset $N_{OD}$ is the offset expressed as an integer value in terms of track or track number between the read element 308 and write element 306 of head 118 when the head 118 is positioned at the outer diameter of the disc 108. The offset may change as the head 118 moves from the outer diameter to the inner diameter. It should be noted that 'A' and 'B' servo bursts 326, 328 are shown for exemplary purposes only, and it is to be understood that other servo burst configurations are also applicable, including quadrature patterns.

Figure 4A:
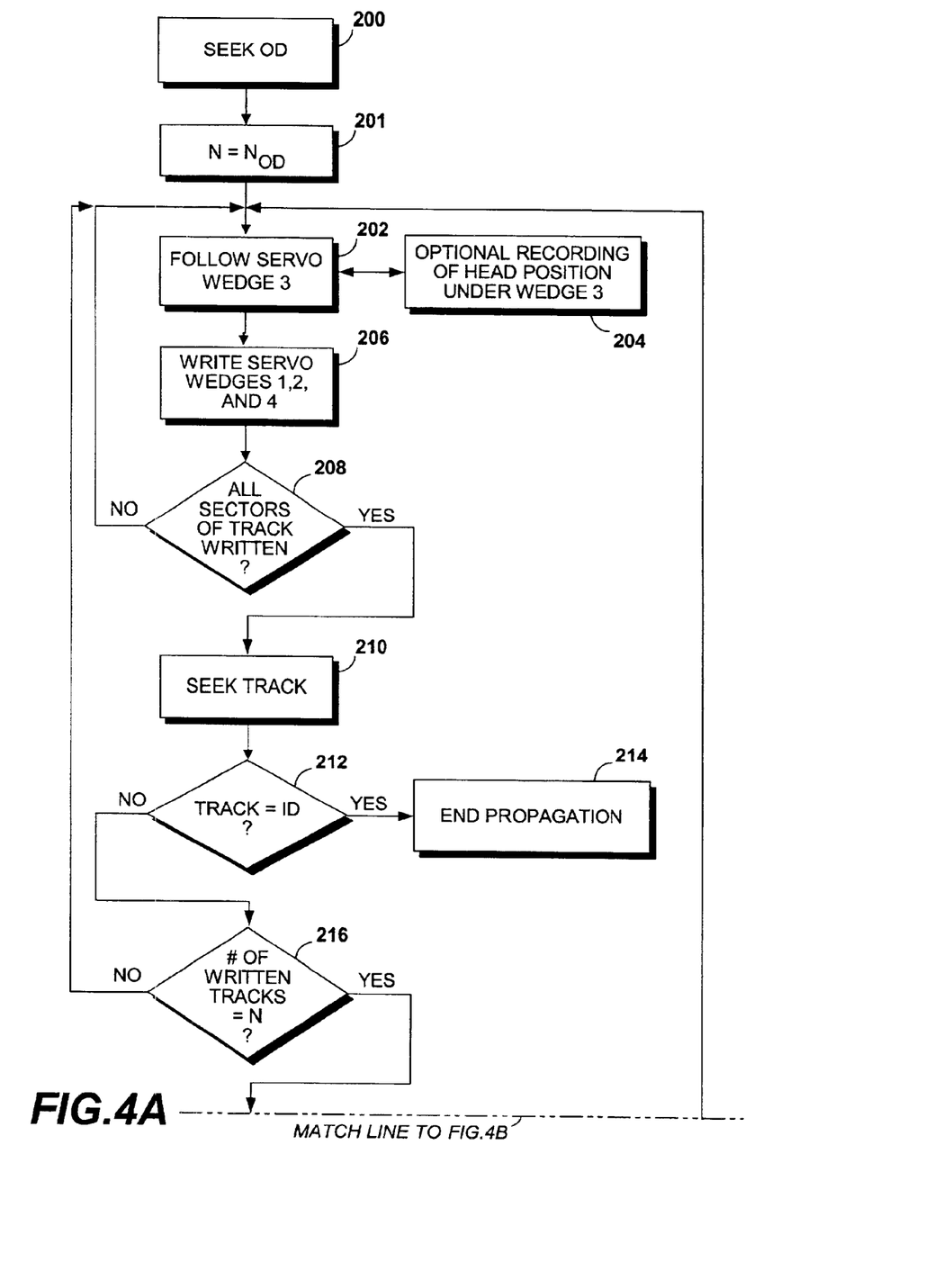
FIGS. 4A–4C contain a flow chart of an embodiment of a servo wedge propagation subroutine of the servowriting process of FIG. 3.
Figure 4B:
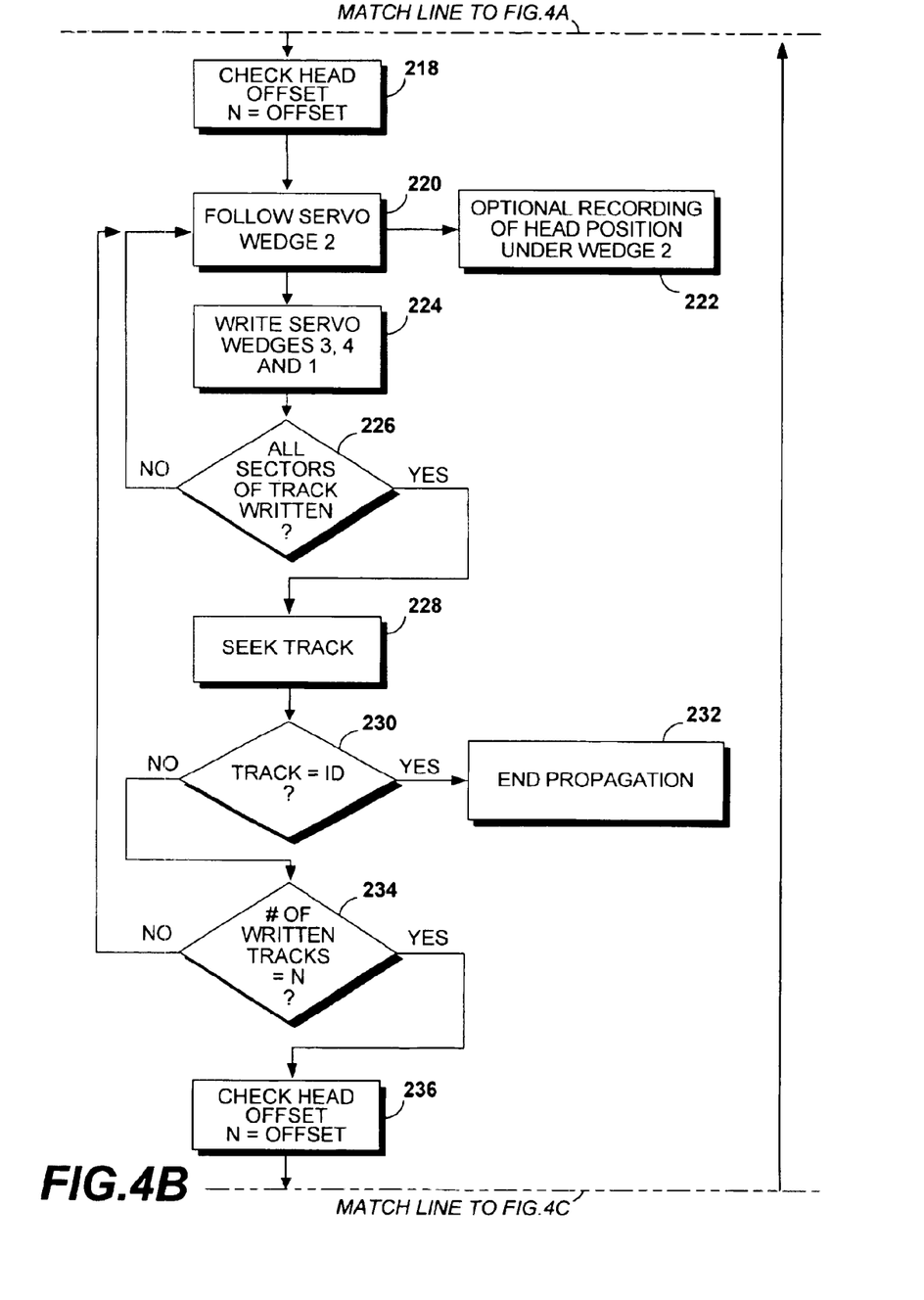
Figure 4C:
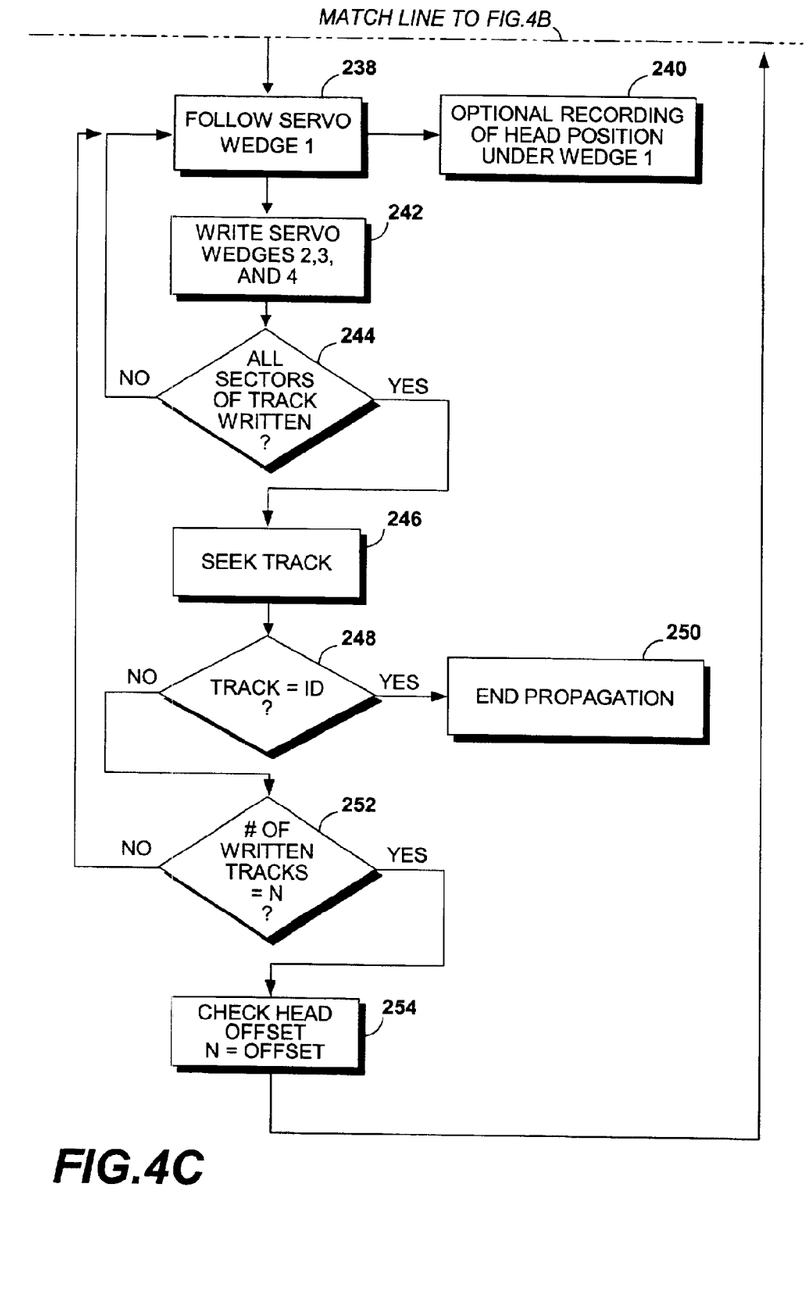
Figure 5:
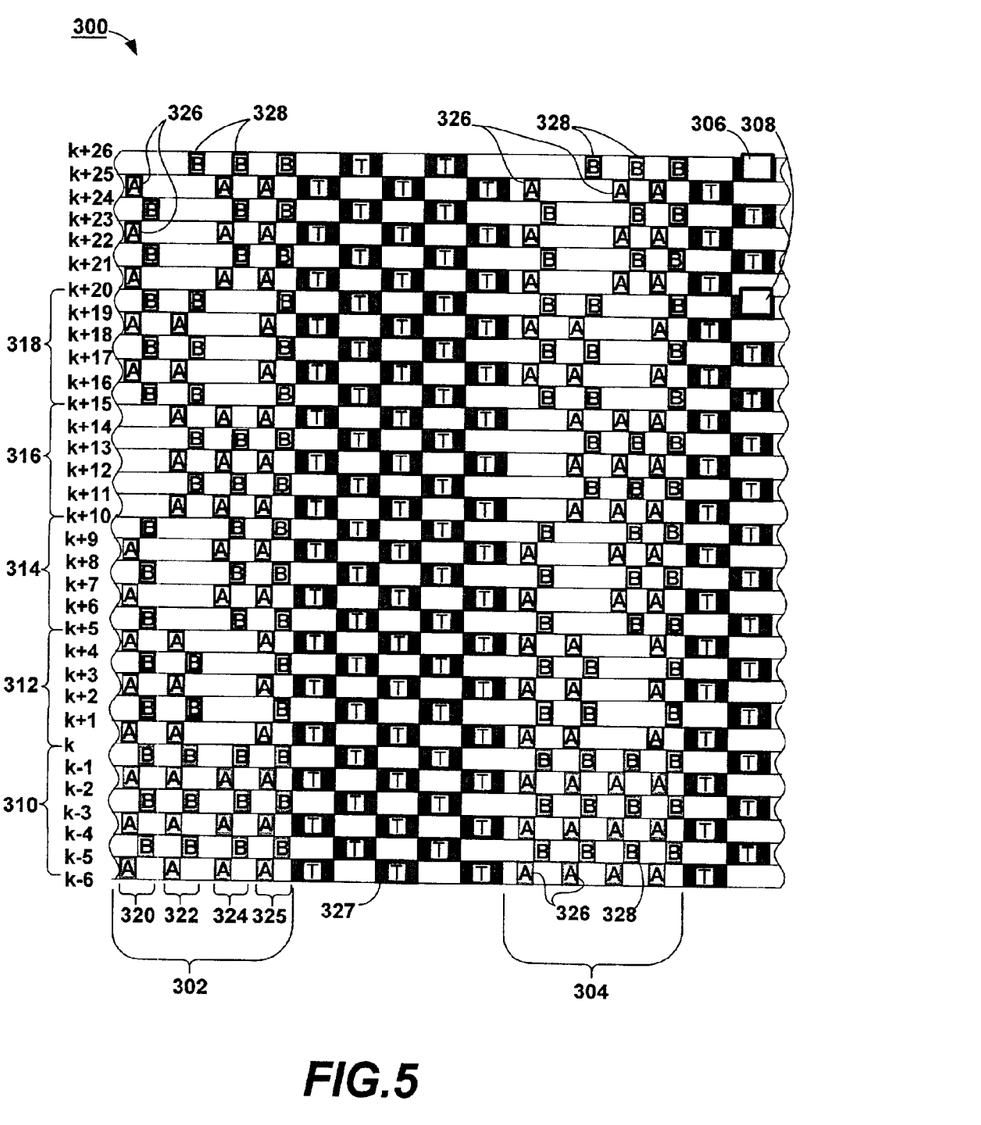
FIG. 5. is a plan view of two adjacent sector locations for several tracks of a disc of the disc drive of FIG. 1 with servo wedges written in accordance with the preferred embodiment of the invention.

The offset $N_{OD}$ shown in the example shown in FIG. 5 is equal to five, and the set of tracks 310 defined by track boundaries k−6 through k are written as discussed above with bursts for three servo wedges 320, 322, and 324 per sector 302, 304. An offset of the read element 308 and write element 306 at the outer diameter can be a number of tracks other than five, but should be a number great enough so that the offset at the inner diameter is at least one to use the propagation procedure throughout the drive. After these $N_{OD}$+1 or more reference tracks have been written, propagation operation 170 begins. The propagation operation 170 is shown in greater detail in FIGS. 4A–4C.

The propagation operation 170 begins at seek operation 200 by seeking the reader 308 to the outer diameter (OD) of the disc 108 over the track boundary k−5 so that the writer 306 is positioned over the track defined by boundaries k and k+1. At offset operation 201, the head offset variable N is set equal to $N_{OD}$ because the head 118 is positioned at the outer diameter of the disc 108. Then read operation 202 reads the third servo wedge 324, which acts as a guide during the propagation of guide wedges 320, 322 and propagation of a radially continuous fourth servo wedge 325 for each sector 302, 304 for the track or track boundary currently being followed. Reading the third servo wedge 324 allows the position of the head 118 to be controlled during a revolution of the disc 108 such that the write element 306 remains positioned over the track where servo wedges are to be written.

During the following of servo wedge three 324 at read operation 202, the propagation routine may also record the position of the head 118 relative to an ideal track center at record operation 204. The recording of the position of the head 118 relative to the ideal track center at each wedge being read provides the necessary position error information for a zoro acceleration path (ZAP) process to be performed, as is known in the art, to produce correction coefficients. The correction coefficients from ZAP are later applied to permit the head 118 to follow a more circular track than is initially provided for by the servo bursts of the servo wedge writing process.

After having read the position at the third wedge 324, the read/write channel 146 writes a burst pattern, such as burst 'A', in the track that the write element 306 is positioned over at write operation 206. For example, when the reader 308 is positioned on track boundary k−5 to read the third wedge 324, the writer 306 writes 'A' bursts for the first servo wedge 320 and second servo wedge 322 on the track defined by track boundaries k and k+1 of either the sector position 302 or sector position 304 depending upon the direction of rotation of the disc 108. On a preceding or subsequent track, the 'B' burst would be written for the servo wedges 320, 322 as shown for the track defined by boundaries k+1 and k+2. Thus, write operation 206 alternates the particular guide wedge to be written from one track to the next. Write operation 206 also writes the fourth servo wedge 325 at a time other than when the first wedge position 320, second wedge position 322, and third wedge position 324 are under head 118 so that the radially continuous fourth servo wedge 325 is available for track following during normal operation.

Query operation 208 detects whether first servo wedge 320 and second servo wedge 322 for all sectors of the current track under writer 306 have been written. If query operation 208 detects that all servo wedges for all sectors of the track have not been written, then the process returns to read operation 202 where servo wedge three 324 of the next adjacent sector is read, and the process then continues. One revolution is all that is required to write both servo wedges 320, 322 and the fourth radially continuous servo wedge 325 for all sectors of a track because the reader 308 reads the third wedge 324, which is positioned at the head 118 at a time other than when the first and second wedges 320, 322 and the fourth radially continuous wedge 325 are positioned at the head 118. Thus, for every switch from a read operation to a write operation, at least two wedges plus the radially continuous fourth wedge 325 are written rather than just one wedge. Also within this one revolution, the ZAP information for the entire track has optionally been collected.

Once query operation 208 has detected that the first and second servo wedges 320, 322 and the fourth radially continuous wedge 325 have been written for all sectors of the track, seek operation 210 seeks the head 118 one track so that the reader 308 now resides over track boundary k−4 and the writer 306 now resides over the track defined by boundaries k+1 and k+2. Query operation 212 then detects whether the new position of the head 118 is the inner diameter of the disc 108. If so, then the servo wedges have been propagated to all of the tracks and terminate operation 214 stops the propagation routine.

If query operation 208 detects that the inner diameter has not yet been reached, then the flow moves to query operation 216 which detects whether the number of written tracks equals N, which is currently set to $N_{OD}$ or five in the example shown in FIG. 5. If the number of written tracks does not yet equal N, then the flow returns to read operation 202 and the process continues as previously discussed until again returning to query operation 216. Once query operation 216 detects that the number of written tracks equals N, then flow moves to offset operation 218. At this point, the set of tracks 312 has been written to and the writer 306 has been positioned over the outermost track, defined by boundaries k+5 and k+6, of the set of tracks 314. The reader 308 is positioned over boundary k.

Offset operation 218 then checks the offset of the drive at the head's current position. This offset value may be stored in MEM 143 from previously executed offset tests done prior to the propagation process whereby the writer 306 writes information at a given radial position and then the head 118 is moved until the reader 308 is positioned over the written information. The distance the head 118 moved is equal to the offset. This offset calibration may be done throughout the radial positions of the disc 108 or at the inner and outer diameters with the offsets in-between being interpolated based on an offset head formula. The offset must be checked at offset operation 218 because, as mentioned above, the offset will change due to the rotating actuator 110 moving the head 118 in an arc across the radial positions of the disc 108 rather than in a linear fashion.

After finding the offset, N is then set to the rounded integer value of the offset at offset operation 218 for purposes of controlling the number of tracks to write with a given guide servo wedge pattern (i.e., guide wedge position pairs 320, 322 or 320, 324, or 322, 324). The fractional part of the offset is still used to properly position the writer 306 over the center of each track. In the example of FIG. 5, the offset did not change from seeking the writer 306 from the innermost track of set 312 to the outermost track of set 314 so N remains equal to five. The propagation process then continues at read operation 220 where the reader 308 now reads the second servo wedge 322 along track boundary k. Again, the position relative to an ideal track center may be recorded at record operation 222 for ZAP purposes.

After reading the second servo wedge 322, servo wedges three 324 and one 320 are written at write operation 224.

However, either wedge three 324 or wedge one 320 will be written first in the next adjacent sector during this iteration depending upon the directional rotation of the disc 108. Thus, the first sector of this track where wedge two 322 is read will become the last sector to write to because either wedge one 320 or wedge three 324 or the fourth radially continuous wedge 325 of the first sector of this track will not yet have been written, depending upon the rotational direction. As shown, the 'B' burst is written for the outermost track of set 314. As discussed above, write operation 224 writes a fourth radially continuous servo wedge 325 for each sector of each track that is later used for track following during normal operation.

Query operation 226 detects whether all sectors have been written to in the first and third wedge positions 320, 324 and in the fourth radially continuous position. Again, writing these wedges for all sectors of a track should take no more than one revolution. If all sectors have not been written to, then the flow returns to read operation 220. If all sectors of the current track have been written to in the first and third wedge positions 320, 324 and in the fourth radially continuous position 325, then control moves to seek operation 228.

Seek operation 228 seeks the head 118 one track so that the reader 308 moves from track boundary k to boundary k+1 and the writer 306 moves to the track with boundaries k+6 and k+7. Then query operation 230 detects whether the head 118 has moved to the inner diameter of the disc 108. If so, then terminate operation 232 stops the propagation process. If the inner diameter has not yet been reached, then query operation 234 detects whether the number of tracks that have been written is equal to N, the current offset. If not, then flow returns to read operation 220 and the propagation process continues reading wedge two 322 while writing wedges one 320 and three 324 and radially continuous wedge four 325 for the tracks.

Once query operation 234 has detected that the number of tracks written to equals the current head offset, flow moves to offset operation 236. Again, the head offset resulting from the seek is determined, such as by referencing a table stored in MEM143 and N is set equal to the current offset. In the example of FIG. 5, the offset remains at five after seeking the writer 306 from the innermost track of set 314 to the outermost track of set 316.

Read operation 238 then reads the first servo wedge 320 of the sector of the current track, such as track boundary k+5, to track follow. Recording operation 240 may simultaneously record the head position relative to the ideal track center for ZAP purposes. Write operation 242 then writes the second and third servo wedges 322, 324 such as the 'A' or 'B' bursts for the current track defined by boundaries k+10 and k+11. Write operation 242 also writes the fourth radially continuous servo wedge 325 to be used during normal operation. Query operation 244 then detects whether the second and third wedges 322, 324 and the fourth radially continuous wedge 325 have been written for all sectors of the current track. If not, the flow returns to read operation 238 for the next adjacent sector. If all sectors have been written, then flow proceeds to seek operation 246.

Seek operation 246 seeks the head 118 one track so that the writer 306 moves to the track bounded by k+11 and k+12 and the reader 308 moves to boundary k+6. Query operation 248 detects whether the head 118 is positioned at the inner diameter of the disc 108. If so, then terminate operation 250 stops the propagation process. If the inner diameter has not been reached, then flow proceeds to query operation 252. Query operation 252 detects whether the number of written tracks of this set equals N, the current offset. If not, then flow returns to read operation 238. If so, then control proceeds to offset operation 254.

Offset operation 254 checks the offset that exists after the last seek, and N is set equal to the offset. In the example of FIG. 5, the offset remains at five after the seek of the writer 306 from the innermost track of set 316 to the outermost track of set 318. Control then returns to read operation 202 where the propagation process begins to follow servo wedge three 324 and write servo wedges one 320 and two 322 and the fourth radially continuous servo wedge 325. The propagation process repeats in this manner until the inner diameter of the disc 108 is reached. Once the inner diameter is reached, all tracks have at least one complete and radially continuous servo wedge in the fourth wedge position 325 propagated per sector, and the total number of revolutions required equals the total number of tracks upon which the servo wedges were propagated.

In conclusion, an embodiment of the present invention may be viewed as a method (such as 170) of servowriting in a disc drive (such as 100) having a head (such as 118) with an offset between a read element (such as 308) and a write element (such as 306). The method involves, a) during an instance of a first sector position (such as 302) passing by the head, reading (such as 202) a third servo wedge (such as 324) on a first track (such as k−5) with the read element. The method further involves, during the instance of the first sector position passing by the head, and not during reading step (a), writing (such as 206) one or more servo wedges (such as 320, 322, 325) on a second track (such as k\k+1) with the write element.

The method (such as 170) may further involve, (c) during one revolution of a disc (such as 108) of the disc drive (such as 100), repeating reading step (a) (such as 202) and writing step (b) (such as 206) for all sector positions of the track (such as k\k+1). The method may further involve, (d) prior to reading step a) and writing step b), writing (such as 160), with a Servo Track Writer, servo wedges for a number of adjacent tracks (such as 310) greater than or equal to the offset between the read element (such as 308) and write element (such as 306). The method may also further involve f) recording (such as 204) a head position determined from reading step a) relative to an ideal track center.

In the plurality of sectors (such as 304) other than the first sector (such as 302) the third servo wedge (such as 324) may be read before the first (such as 320) and second servo wedges (such as 322) are written. The second servo wedge (such as 322) may be read after the first servo wedge (such as 320) is written but before the third servo wedge (such as 324) is written. The first servo wedge (such as 320) may be read before the second (such as 322) and third servo wedges (such as 324) are written. In an opposite direction of the disc (such as 108) these orders are reserved.

The method (such as 160) may further involve (g) finding (such as 218) a head offset, (h) performing reading step a) (such as 202) and writing step b) (such as 206) for all the sector positions on a track according to either reading step a)(1), reading step a)(2), or reading step a)(3), (i) seeking (such as 210) the head (such as 118) one track, (j) repeating performing step (h) and seeking step (i) a set of repetitions equal to the head offset, and (k) repeating step (g) through step (j) for all tracks using reading step a)(1), reading step a)(2), or reading step a)(3) but not the reading step a)(1), reading step a)(2), or reading step a)(3) used in an immediately preceding two sets of repetitions.

An embodiment of the present invention may also be viewed as a disc drive (such as 100) that writes servo wedges (such as 320, 322, 324 and 325). The disc drive includes one or more discs (such as 108) having a plurality of tracks divided into a plurality of sector positions (such as 302, 304). A head (such as 118) has a read element (such as 308) and a write element (such as 306) separated by an offset. A read/write channel (such as 146) is in electrical communication with the read element and the write element. During an instance of a first sector position (such as 302) passing by the head, the read/write channel reads a third servo wedge (such as 324) on a first track (such as k−5) with the read element, and during the instance of the first sector position passing by the head and not during reading of the first servo wedge, the read/write channel writes a first (such as 320) and second servo wedge (such as 322) on a second track with the write element.

During one revolution of the one or more discs of the disc drive, the read/write channel (such as 146) may repeat reading the third servo wedge (such as 324) and writing the first (such as 320) and second servo wedges (such as 322) for all sector positions (such as 302, 304) of the track. At least three servo wedges (such as 320, 322, and 324) may be located in each sector position for a number of adjacent tracks (such as 310) equal to the offset between the read element (such as 308) and write element (such as 306). During the instance of the first sector position (such as 302) passing by the head (such as 118), and not during reading of the third servo wedge or writing of the first and second servo wedges, the read/write channel may write a fourth servo wedge (such as 325) for the first sector position.

The disc drive (such as 100) may include memory (such as 143) in electrical communication with the read/write channel (such as 146), and the memory records a head position relative to an ideal track center determined from the read/write channel reading the third servo wedge (such as 324). The read/write channel may read the third servo wedge before writing the first (such as 320) and second servo wedges (such as 322). The read/write channel may read the second servo wedge (such as 322) after writing the first servo wedge (such as 320) but before writing the third servo wedge (such as 324). The read/write channel may read the first servo wedge (such as 320) before writing the second (such as 322) and third servo wedges (such as 324).

The disc drive (such as 100) may also include an actuator (such as 110) for positioning the head (such as 118) and may include a processor (such as 142) in communication with the read/write channel (such as 146). The processor may be configured to find a head offset from the read/write channel reading the third servo wedge (such as 324), and the processor may be further configured to cause the actuator to seek the head one track after the first (such as 320) and second servo wedges (such as 322) have been written for all sector positions (such as 302, 304) of a track, and further configured to cause the read/write channel to switch to a different order of reading and writing for each sector position after reading the servo wedge and writing two or more servo wedges according to a first order for a number of tracks equal to the head offset.

It will be clear that the embodiments of the present invention are well adapted to attain the ends and advantages mentioned as well as those inherent therein. While a presently preferred embodiment has been described for purposes of this disclosure, various changes and modifications may be made which are well within the scope of the present invention. For example, the servo wedges may be written with greater than the two components A and B shown in FIG. 5, such as by writing four components to establish a quadrature burst pattern. Additionally, the present invention may be implemented by providing special-purpose digital logic, digital logic loaded as an overlay in the buffer 144 which can then be implemented by the processor 142 and discarded after servowriting completes, or as special-purpose or programmable additional circuitry added specifically to implement the servowriting process. Numerous other changes may be made which will readily suggest themselves to those skilled in the art and which are encompassed in the spirit of the invention disclosed and as defined in the appended claims.

What is claimed is:

1. A method of servowriting in a disc drive having a head with an offset radially between a read element and a write element, the method comprising steps of:

during an instance of a first sector position passing by the head, reading a servo wedge on a first track with the read element; and during the instance of the first sector position passing by the head, and not during the reading a servo wedge step, writing two or more servo bursts on a second track with the write element; and recording a head position determined from the reading a servo wedge step relative to an ideal track center.

2. The method of claim 1 further comprising a step of:

during one revolution of a disc of the disc drive, repeating the reading a servo wedge step and the writing servo bursts step for all sector positions of the track.

3. The method of claim 1 further comprising a step of:

prior to the reading a servo wedge step and the writing servo bursts step, writing, with a Servo Track Writer, servo wedges for a number of adjacent tracks greater than the offset between the read element and write element.

4. The method of claim 1, wherein the reading the servo wedge is performed before writing the two or more servo bursts.

5. The method of claim 1, wherein the reading the servo wedge is performed after writing one servo burst and before writing another servo burst.

6. The method of claim 1, wherein the reading the servo wedge is performed after writing the two or more servo bursts.

7. A method of servowriting in a disc drive having a head with an offset radially between a read element and a write element, the method comprising steps of:

during an instance of a first sector position passing by the head, reading a servo wedge on a first track with the read element by steps comprising:

(a) reading the servo wedge before writing two or more servo bursts; or (b) reading the servo wedge after writing one servo burst and before writing another servo burst; or (c) reading the servo wedge after writing two or more servo bursts; and wherein the method further comprises steps of:

during the instance of the first sector position passing by the head, and not during the reading a servo wedge step, writing the two or more servo bursts on a second track with the write element;

finding a head offset;

performing the reading a servo wedge step and the writing servo bursts step for all the sector positions on a track according to either the reading step (a), the reading step (b), or the reading step (c);

seeking the head one track;

repeating the performing step and the seeking step a set of repetitions equal to the head offset; and repeating the finding step, performing step, seeking step and repeating step for all tracks using the reading step (a), the reading step (b), or the reading step (c) but not the reading step (a), the reading step (b), or the reading step (c) used in an immediately preceding two sets of repeating the performing step and the seeking step.

8. A disc drive that writes servo wedges, comprising:

one or more discs having a plurality of tracks divided into a plurality of sector positions;

an actuator positioning a head having a read element and a write element separated by an offset radially;

a read/write channel in electrical communication with the read element and the write element, wherein during an instance of a first sector position passing by the head, the read/write channel reads a servo wedge on a first track with the read element, and during the instance of the first sector position passing by the head and not during reading of the first servo wedge, the read/write channel writes two or more servo bursts on a second track with the write element; and a processor in communication with the read/write channel, the processor being configured for finding a head offset and switching to a different order the reading and writing for each sector position after reading the servo wedge and the writing servo bursts according to a first order for a number of tracks equal to the head offset.

9. The disc drive of claim 8, wherein during one revolution of the one or more discs of the disc drive, the read/write channel repeats reading the servo wedge and writing the servo bursts for all sector positions of the track.

10. The disc drive of claim 8, wherein the read/write channel reads the servo wedge before writing the servo bursts.

11. The disc drive of claim 8, wherein the read/write channel reads the servo wedge after writing one of the servo bursts and before writing another one of the servo bursts.

12. The disc drive of claim 8, wherein the read/write channel reads the servo wedge after writing the servo bursts.

13. A disc drive that writes servo wedges, comprising:

one or more discs having a plurality of tracks divided into a plurality of sector positions;

a head having a read element and a write element separated by an offset radially;

a read/write channel in electrical communication with the read element and the write element, wherein during an instance of a first sector position passing by the head, the read/write channel reads a servo wedge on a first track with the read element, and during the instance of the first sector position passing by the head and not during reading of the first servo wedge, the read/write channel writes two or more servo bursts on a second track with the write element; and wherein at least three servo wedges are located in each sector position for a number of adjacent tracks greater than the offset between the read element and write element.

14. A disc drive that writes servo wedges, comprising;

one or more discs having a plurality of tracks divided into a plurality of sector positions;

a head having a read element and a write element separated by an offset radially;

a read/write channel in electrical communication with the read element and the write element, wherein during an instance of a first sector position passing by the head, the read/write channel reads a servo wedge on a first track with the read element, and during the instance of the first sector position passing by the head and not during reading of the first servo wedge, the read/write channel writes two or more servo bursts on a second track with the write element; and memory in electrical communication with the read/write channel, wherein the memory records a head position relative to an ideal track center determined from the read/write channel reading the servo wedge.

15. A disc drive, comprising:

a head having a read element radially offset from a write element; and means for writing servo wedges with the head for each sector position of a plurality of tracks of the disc drive.

16. The disc drive of claim 15, wherein the means for writing is configured to read a servo wedge from a first track and write two or more servo bursts to a second track during an instance of a first sector position passing by the head.

17. The disc drive of claim 16, wherein the tracks are located on one or more discs and wherein during one revolution of the one or more discs of the disc drive, the means for writing repeats reading the servo wedge and writing the servo bursts for all sector positions of the track.

18. The disc drive of claim 16, wherein at least three servo wedges are located in each sector position for a number of adjacent tracks greater than the offset between the read element and write element.

19. The disc drive of claim 16, further comprising a memory in electrical communication with the means for writing, wherein the memory records a head position relative to an ideal track center determined from the means for writing the servo wedges.

20. The disc drive of claim 16, wherein the disc drive further comprises:

an actuator for positioning the head; and wherein the means for writing comprises a processor in communication with a read/write channel, the processor being configured to find a head offset from the read/write channel reading the servo wedge, the processor being further configured to cause the actuator to seek the head one track after the servo bursts have been written for all sector positions of a track, and further configured to cause the read/write channel to switch to a different order of reading and writing for each sector position after reading the servo wedge and writing servo bursts according to a first order for a number of tracks equal to the head offset.

* * * * *